(12) United States Patent
Kesarwani et al.

(10) Patent No.: US 10,691,558 B1
(45) Date of Patent: Jun. 23, 2020

(54) FAULT TOLERANT DATA EXPORT USING SNAPSHOTS

(71) Applicant: Amazon Technologies, Inc., Reno, NV (US)

(72) Inventors: Nitin Kesarwani, Seattle, WA (US); Sheikh Naveed Zafar, Lynwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 15/272,832

(22) Filed: Sep. 22, 2016

(51) Int. Cl.
*G06F 11/14* (2006.01)
*G06F 16/23* (2019.01)
*H04L 29/08* (2006.01)

(52) U.S. Cl.
CPC ...... *G06F 11/1474* (2013.01); *G06F 11/1451* (2013.01); *G06F 11/1469* (2013.01); *G06F 16/235* (2019.01); *H04L 67/1097* (2013.01); *G06F 2201/805* (2013.01); *G06F 2201/82* (2013.01); *G06F 2201/84* (2013.01); *Y10S 707/99938* (2013.01)

(58) Field of Classification Search
CPC ............... H04L 67/10; H04L 67/1097; H04L 29/08945; H04L 29/08954; H04L 29/08963; Y10S 707/99933; Y10S 707/99938; G06F 9/4881; G06F 9/4806; G06F 9/4843; G06F 9/466; G06F 17/30; G06F 17/30008; G06F 17/30011; G06F 17/30017; G06F 17/30861; G06F 17/3089; G06F 17/30893; G06F 17/30386; G06F 17/30424; G06F 17/30442; G06F 17/30445; G06F 11/1474; G06F 2201/82
See application file for complete search history.

(56) References Cited

U.S. PATENT DOCUMENTS

| | | | | |
|---|---|---|---|---|
| 5,623,688 A | * | 4/1997 | Ikeda | G06F 15/17 709/234 |
| 2004/0255034 A1 | * | 12/2004 | Choi | H04L 29/06 709/229 |
| 2005/0204034 A1 | * | 9/2005 | Betarbet | G06F 11/3006 709/224 |

(Continued)

OTHER PUBLICATIONS

"How Much Data Did Facebook Have on One Man? 1,200 Pages of Data in 57 Categories" by Olivia Solon published by Wired, Dec. 28, 2012 https://www.wired.co.uk/article/privacy-versus-facebook (Year: 2012).*

*Primary Examiner* — Joseph O Schell
(74) *Attorney, Agent, or Firm* — Hogan Lovells US LLP (57) ABSTRACT

Fault tolerant data export is provided through the checkpointing of various export tasks. Data entries, such as event log records, to be exported are assigned to a set of discrete export tasks. A snapshot of the data can be taken to indicate the state of the data to be exported. The tasks can be performed using appropriate resources, and for each task that completes successfully an entry can be made in a checkpoint data file or a virtual cursor can be updated for the snapshot indicating completion of that task. In the event of a failure of one or more tasks, a workflow manager or other such component can determine which tasks failed using the checkpointing data and retry only those specific tasks, without having to retry the entire export.

17 Claims, 6 Drawing Sheets

(56) References Cited

U.S. PATENT DOCUMENTS

| | | | |
|---|---|---|---|
| 2006/0153201 A1* | 7/2006 | Hepper | H04L 47/10 370/395.42 |
| 2012/0166726 A1* | 6/2012 | De Schrijver | G06F 11/2094 711/114 |
| 2015/0169624 A1* | 6/2015 | Gupta | G06F 17/30864 707/639 |
| 2015/0294118 A1* | 10/2015 | Parker | G06F 21/606 726/26 |
| 2017/0052828 A1* | 2/2017 | Baptist | H04L 63/0428 |

* cited by examiner

FAULT TOLERANT DATA EXPORT USING SNAPSHOTS

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. In many instances a user might want to export a portion of their data stored in the environment. There might be cases where a portion of the export will fail, which can cause the entire export process to start over. This can result in redundant work that can unnecessarily consume resources, which can be particularly problematic for large exports.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the fault tolerant data operations. In particular, various embodiments can determine data entries, such as log data entries, to be exported and can assign those entries to a set of discrete tasks to be performed. A snapshot of the data can be taken to indicate the state of the relevant data to be included in the export. This can include information such as log entry identifiers, time codes, storage locations, or any other information useful in identifying a state of the log data at a time of the request. In at least some embodiments the snapshot can include the actual log data such that any subsequent changes to an entry will not be reflected in the exported log data. The tasks can be performed according to a task schedule, job queue, or other such mechanism, and for each task that completes successfully an entry can be made in a checkpoint data file or a virtual cursor can be updated for the snapshot indicating that the task completed successfully, among other such options. In the event of a failure of one or more tasks, a workflow manager or other such component or service can determine which tasks failed and retry only those specific tasks, without having to retry the entire export. The tasks can be retried until all tasks for the export complete successfully or a maximum number of retries, or other failure criterion, is reached.

Various other functions can be implemented within the various embodiments as well as discussed and suggested elsewhere herein.

Figure 1:
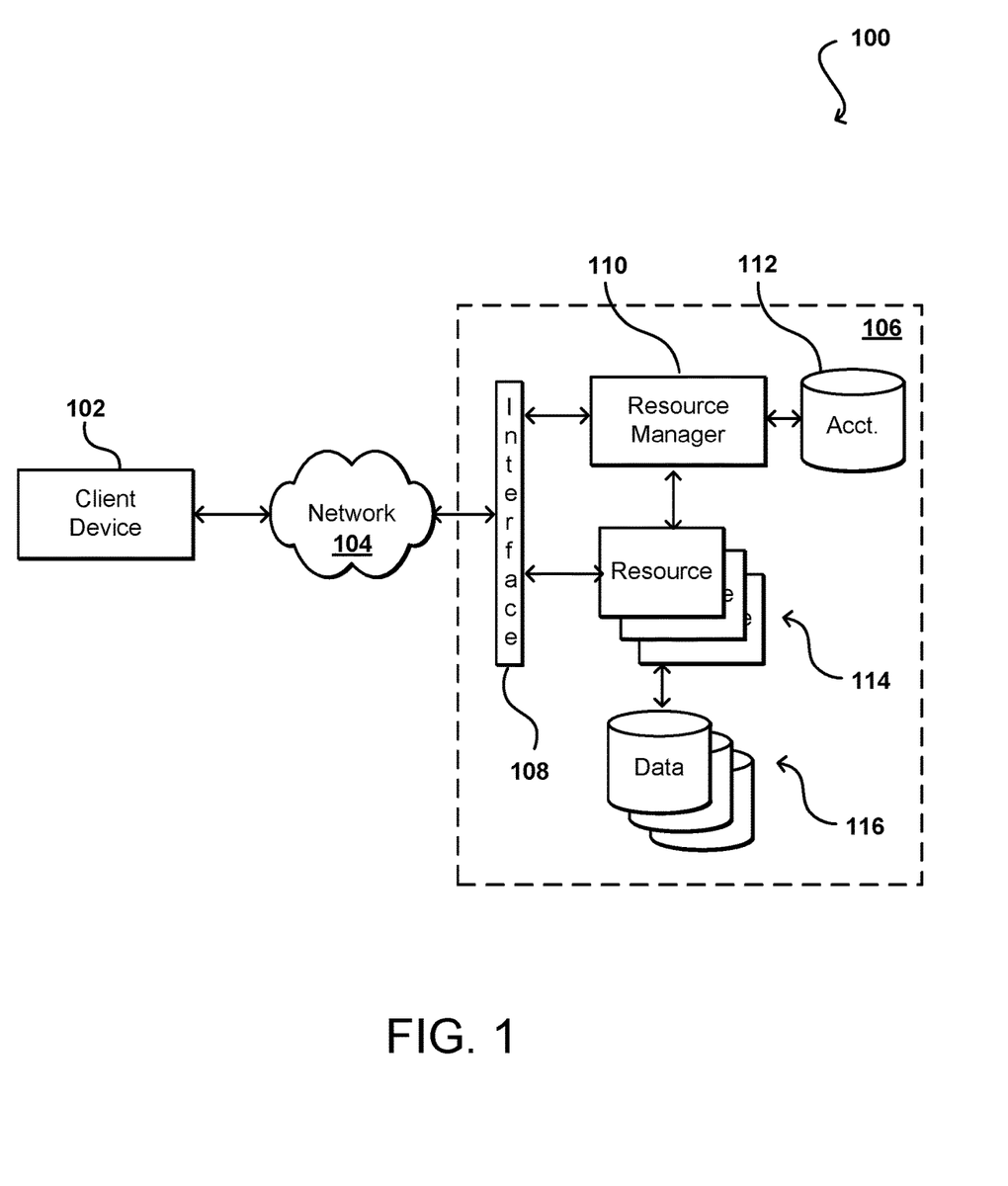
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

As mentioned, in some instances a customer might want to export, obtain, archive, or otherwise access or utilize data stored in a location such as a data store provided through such a multi-tenant environment. This can include, for example, exporting event logs stored to a log service over a specified period of time. For customers with very heavy workloads or many operations occurring in the environment, the export could involve a significant amount of data and take a long time to complete. An example log service can obtain the log data for one or more sources, such as log streams, over the specified period of time and cause the data to be exported to a specified destination, such as a repository or bucket. The log data may be distributed across a number of different locations and the export may involve a number of different components. Over the lengthy export process, one or more instances of the commodity hardware in the environment might experience a fault, or another problem might arise, preventing the entire export from completing properly. In many systems the failure of an export job can cause the export job to be attempted again. If the vast majority of the export had completed properly, then this will result in almost all of the work being repeated. Currently there is no easy way to determine which portions of the export completed properly in order to prevent having to perform the entire export again.

Accordingly, approaches in accordance with various embodiments utilize a checkpointing mechanism to track which portions of a job have completed. A job, such as a data export, can be broken into discrete tasks, each of which may correspond to a set of log records from one or more sources. Each time a task completes, an entry can be written to an export checkpoint file or other such location. In the event that one or more of these tasks fails, the specific failed task(s) can be retried, along with any tasks that were never attempted, without having to retry any task that completed successfully. In some embodiments the tasks may be performed sequentially, while in others embodiments the tasks can be performed concurrently or using any other such approach.

Figure 2:
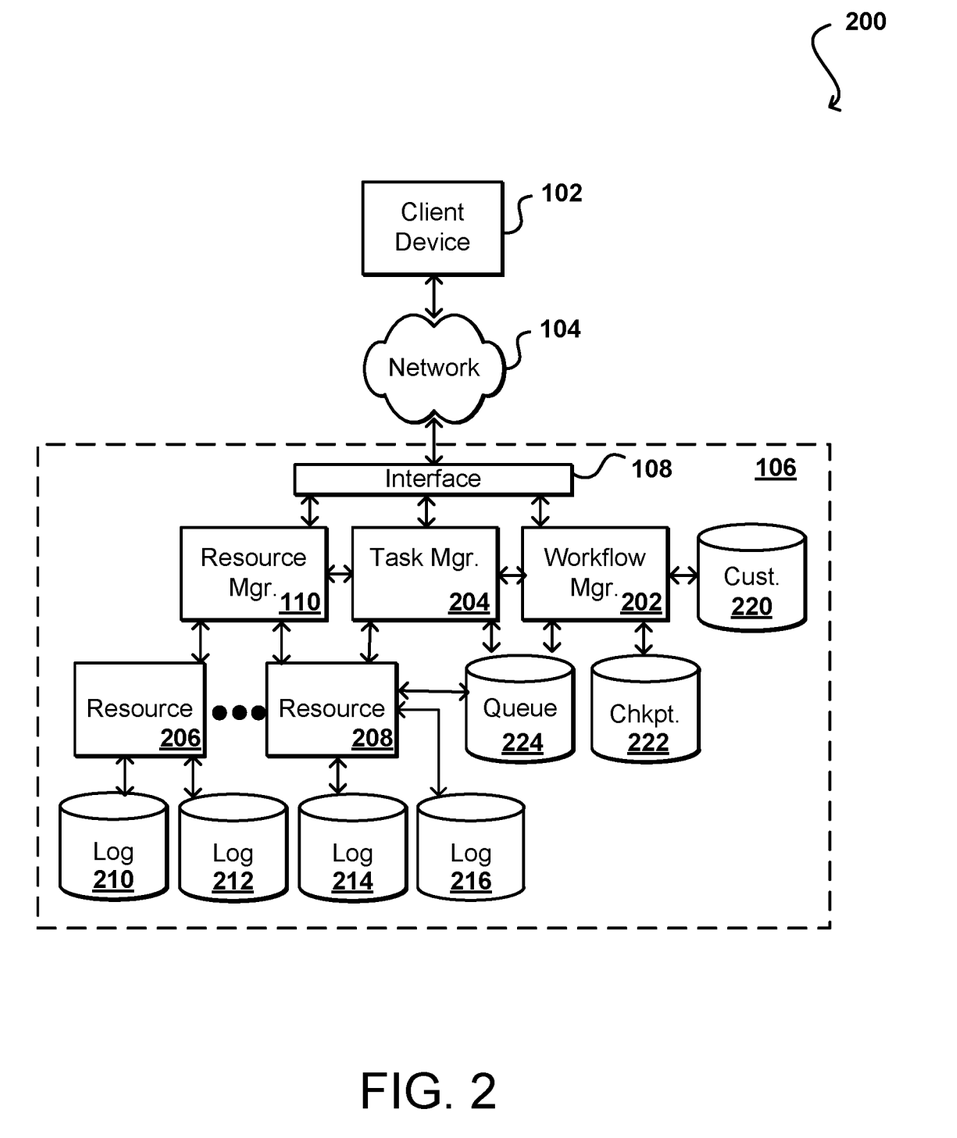
FIG. 2 illustrates an example implementation for performing fault-tolerant data export that can be utilized in accordance with various embodiments.

FIG. 2 illustrates an example implementation 200 that can be utilized in accordance with various embodiments. In this example, a customer can cause a client device 102 to submit one or more requests across at least one network 104 to be received by an interface layer 108 of a resource provider environment. It should be noted that reference numbers may be carried over between figures for similar elements for ease of explanation, but such usage should not be interpreted as a limitation on the scope of the various embodiments unless otherwise specifically stated. In this example, the request specifies a period of time for which to export a set of log data, as may correspond to particular client offering, application, and the like. In other embodiments a customer can specify a range of data entries or group of data objects, among other such options. In some embodiments the request may specify all log data associated with a customer or a specific set of resources, among other such options.

In this example, information for the request can be directed to a workflow manager 202, or other such system or service, that can be configured to generate and manage a workflow for the export. As an initial step, the workflow manager 202 can attempt to determine the relevant log data, such as by querying for all log streams and archival metadata records. The log data may be located in various log data stores 210, 212, 214, 216 located at various locations across (or outside) the resource provider environment 106. The workflow manager can then generate a snapshot of the state of the data, and can store that snapshot to a checkpoint repository 222 or other such location. These steps can correspond to a preparation portion of the export process.

Once the data for the export is identified and the state captured, the workflow manager 202 can work with a task manager 204, or other such system or service, to determine which resources should handle the exporting of the data. In this example the task manager 204 can maintain a pool or fleet or resources, such as virtual machine instances, which can perform tasks for the export. In other embodiments the tasks may be performed by any appropriate resource in an environment, and not necessarily by a resource from a dedicated pool or group. The task manager 204 in some embodiments will work with a resource manager 110 to manage the size of the pool, as well as to ensure that the resources are configured and allocated as appropriate. In some embodiments the task manager 204 will cause discrete tasks for the export to be written as jobs to a job queue 224. The allocated resources 206, 208 can then pull jobs from the queue to be performed by those resources. In some embodiments the tasks can involve various log streams captured for various machines in the resource provider environment, and each resource can be tasked with exporting the allocated log data to a customer bucket 220 or other such location. Each time a resource completes a task for the export, the resource can contact the task manager 204 to indicate that the task has completed, and the task manager 204 can cause (directly or in conjunction with the workflow manager 202) checkpoint data to be written to the checkpoint repository 222. In at least some embodiments this will involve writing an entry to the repository that indicates that a specific task has been completed for the export.

In some embodiments the tasks are performed in sequential order. For such an approach, the workflow manager 202 can be responsible for moving a virtual cursor with respect to the snapshot stored for the export in order to track the progress of data being successfully exported to the customer bucket 220. For cases where the tasks can be performed in various orders, there can be virtual checkboxes or other indicators used with the snapshot file to indicate which portions have completed successfully. This can be in addition, or as an alternative, to storing checkpoint entries to the checkpoint repository 222 for each successfully completed task.

In some embodiments the workflow manager 202 and/or task manager 204 will wait until each task has been attempted for the export before retrying any of the unsuccessful tasks. In other embodiments the workflow manager or task manager can retry a task once it has been determined that the task did not complete successfully. In at least some embodiments this can involve placing the task back in the job queue for processing by a resource of the resource pool. The job might be flagged as a priority, or placed to a priority queue, in some embodiments, while in other embodiments the tasks will be treated the same as other jobs in the queue. If the workflow manager 202 fails, a new workflow manager can refer to the checkpoint repository 222 and/or snapshot file to determine which tasks have been completed or have yet to be completed. In the event of a task manager failure a new task manager can still cause resources to pull jobs from the queue as appropriate. Such an approach can save significant resources and time, such as where 100,000 log streams might need to be exported for a request and a failure towards the end of the process would otherwise require most of those 100,000 log streams to be re-exported. Through successful checkpointing, only those log streams that were not successfully exported will need further attempts and/or processing. Once the export has completed, all the exported data will be present in the customer bucket 220 or other specified destination. The checkpoint data in the repository 222 can then be deleted, as well as any snapshot or other data previously stored for the export.

Figure 3A:
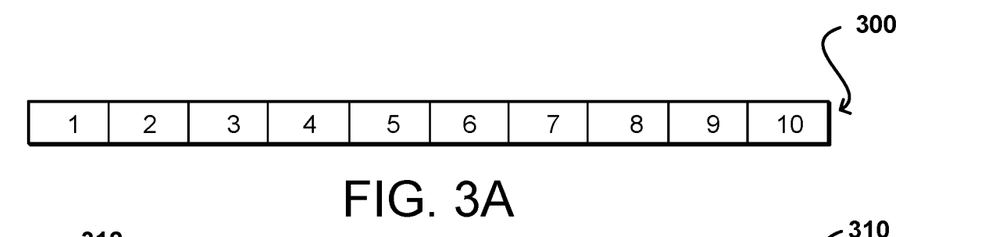
FIGS. 3(a), 3(b), 3(c), 3(d) and 3(e) illustrate example task performance approaches that can be utilized in accordance with various embodiments.
Figure 3B:
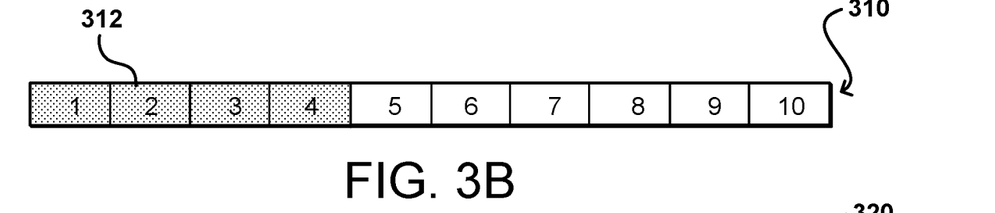
Figure 3C:
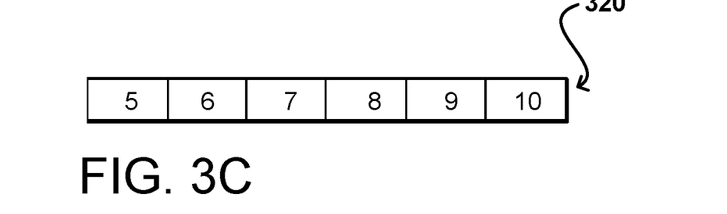

FIG. 3A illustrates a set of tasks 300 that can be performed for an export or other such operation. In this example the data for the export has been identified, and portions of the data assigned to each of ten tasks for the export. The tasks can be assigned so as to be relatively equivalent in size or scope, and can be based on the source of the log data (i.e., similar streams or data sources) or time of the data (i.e., sequential ordering), among other such options. As mentioned, in some embodiments the tasks may be performed in sequential order. In the example situation 310 of FIG. 3B, tasks one through four were successfully written (indicated by the patterned region 312) and a failure occurred at task five. By updating the checkpoint data, or snapshot cursor, for example, the failure point can be determined such that when the export process is retried, the export can resume at task five and attempt to process only remaining tasks five through ten as illustrated in the situation 320 of FIG. 3C.

Figure 3D:
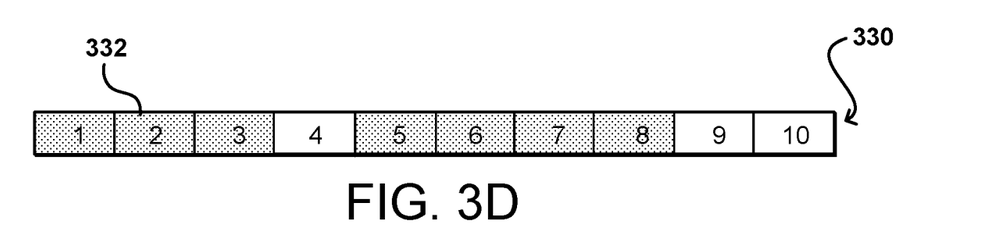
Figure 3E:
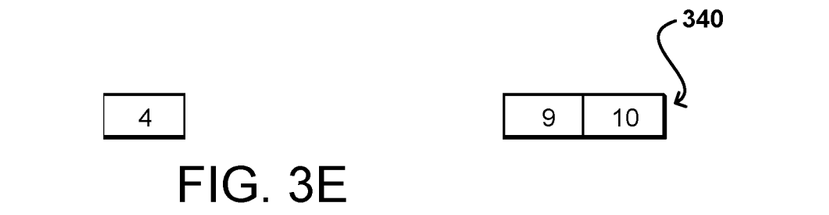

As mentioned, however, certain embodiments do not require sequential performance and the tasks can be performed in any order. Further, the failure of one task may not prevent the other tasks from being performed and/or completed before the failed task is retried. For example, in the situation 330 of FIG. 3D, tasks one through three and five through eight (again represented by a patterned region 332) were exported successfully, while tasks four, nine, and ten were not. Accordingly, by checkpointing each time a task completes successfully, it can readily be determined that only tasks four, nine, and ten were not completed correctly. Accordingly, the workflow manager 202 can cause only those tasks to be added back into the queue to be attempted again using resources from the resource pool. This approach ensures that the export process is converging and that each retry is likely to get closer to the export being completed.

Figure 4:
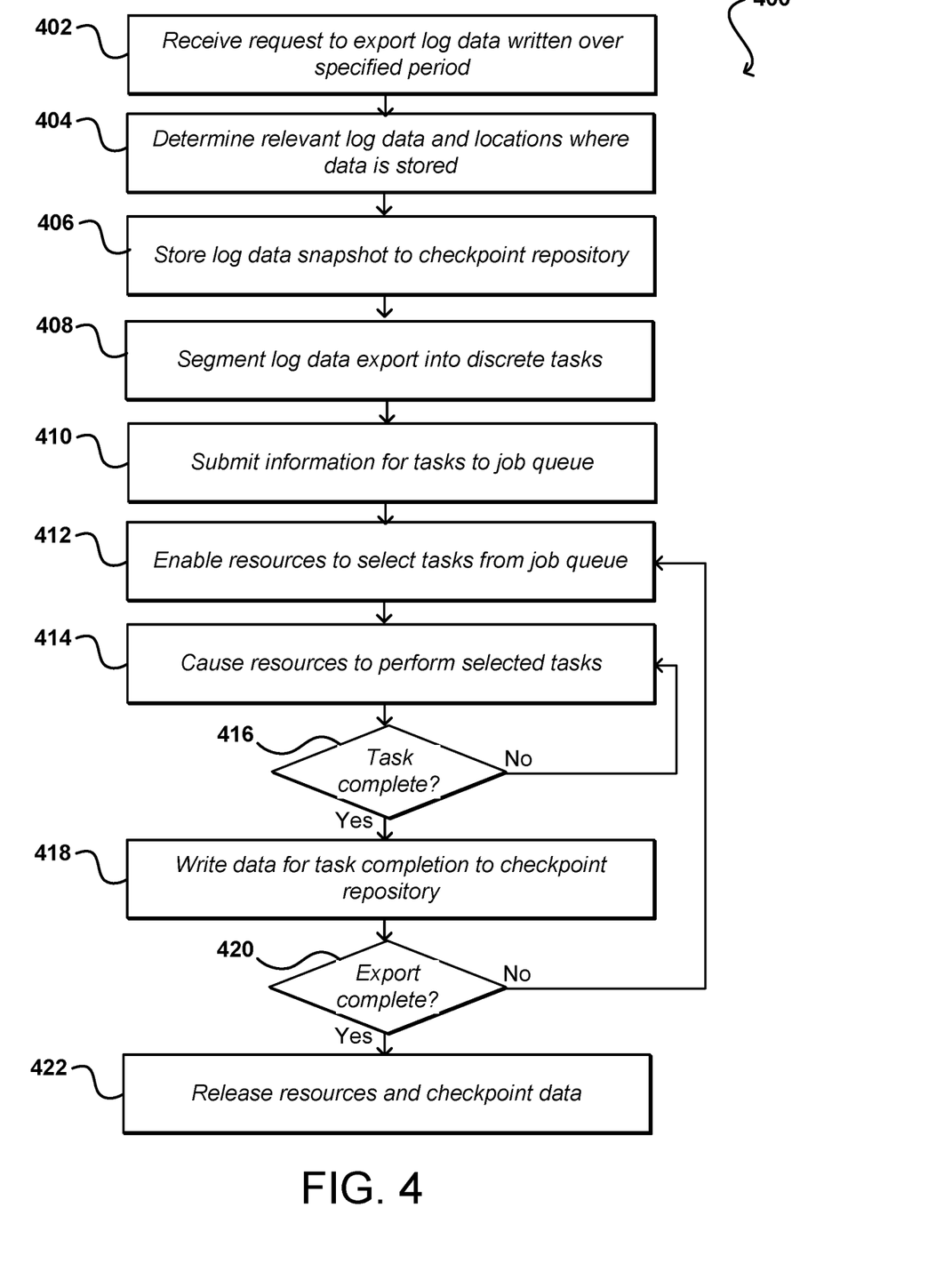
FIG. 4 illustrates an example process for exporting data that can be utilized in accordance with various embodiments

FIG. 4 illustrates an example process 400 for performing a log data export that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a request to export log data is received 402, where the request specifies at least a period of time for which log data is to be exported. It should be understood that the period can include all log data up to the time of the request and/or export in some embodiments. Further, as mentioned elsewhere herein various other types or collections of data can be exported or otherwise processed within the scope of the various embodiments.

Upon receiving the request, a system, service, or process such as a workflow manager can determine 404 the relevant data for the request. This can include, for example, determining the sources of the log data that might be distributed across (or even outside) the resource provider environment, such as one or more event log generators or log streams. These can include sources that processed data relevant to the customer request and were active during the period of the request. For each of these sources, the archival or other storage location can be determined, such as the appropriate repository, data store, or storage object. Once the locations of the relevant log data over the specified time period is determined, another determination can be made as to the amount of data at each location. A snapshot of the state of the log data, including information such as the locations and amount of data, as well as a timestamp for the snapshot, can be generated and stored 406 to an appropriate location, such as a checkpoint repository. While this information can be kept in memory in some embodiments, it can be desirable in at least some embodiments to store a copy of the snapshot to persistent storage in order to enable recovery in the case of a failure.

The log data to be exported can then be analyzed and segmented 408 into discrete tasks to be performed, such as by generating and processing a data image for the export. In some embodiments there can be a fixed number of tasks generated for each export, such as ten tasks per export request. In other embodiments the number of tasks can depend at least in part upon factors such as the amount of data, current load, resource availability, and the like. In some embodiments the tasks will be generated in order to be of substantially the same size, or including roughly equivalent amounts of data to be exported. In other embodiments each task can include data for a similar number of objects, sources, or storage locations, regardless of the amount of data for each. In certain embodiments the data is grouped according to the resource instance for which the log entry was generated. Various other divisions can be used as well within the scope of the various embodiments.

In one embodiment a first level of bucketization involves dividing a number of data objects to be processed evenly across the number of tasks or activities to be performed. This can include, for example, dividing one hundred objects across ten tasks. In this example the relative workload for the tasks can be determined, and objects can be moved between tasks based on size or other such factors. This can result in the same number of objects per task, just with a more even workload distribution, or an uneven number of objects between the various tasks. In situations where data is not organized by object, or where objects are below a determined chunk size, the system can attempt to balance by chunks of similar size, such as 32 mb chunks. In some embodiments the data objects can be generated at the determined chunk size, as well as at regular intervals on a stream or using other such options.

Once the tasks are generated and finalized, information for the tasks (such as task identifiers, etc.) can be submitted 410 to a job queue. Allocated resources, such as activity workers or task performance resources, can be enabled 412 to select tasks from the queue using an appropriate selection criteria, such as FIFO, LIFO, or random selection, among other such options. As mentioned, in some embodiments the tasks are to be performed in sequence, such that tasks may not be added to, or removed from, the queue until all prior tasks have been completed, although in other embodiments the tasks can be taken out at least concurrently, such that a task can be processed by a resource while another task is still being processed, or when a prior task in the sequence has yet to be processed. In some embodiments a task scheduler is used instead of a job queue in order to ensure a designated processing order or otherwise provide more control over the processing.

The allocated resources can then be caused 414 to process the tasks for the export. A determination can be made 416 whether a given task for the export has completed successfully. This can include, for example, receiving an acknowledgment from a respective resource that the export and storage was completed. In some embodiments a hashing algorithm or other such approach can be used to verify the accuracy of the data export as well. Once a task has completed successfully, data for the task completion can be written 418 to a checkpoint repository in order to enable a workflow manager or other such system or service that the task was completed and does not need to be retried in the event of a failure. The process can continue, and when it is determined 420 that the export has completed, the allocated resources and checkpoint data for the export that have not already been released can be released 422, deleted, or destroyed in order to free up system resources.

Figure 5:
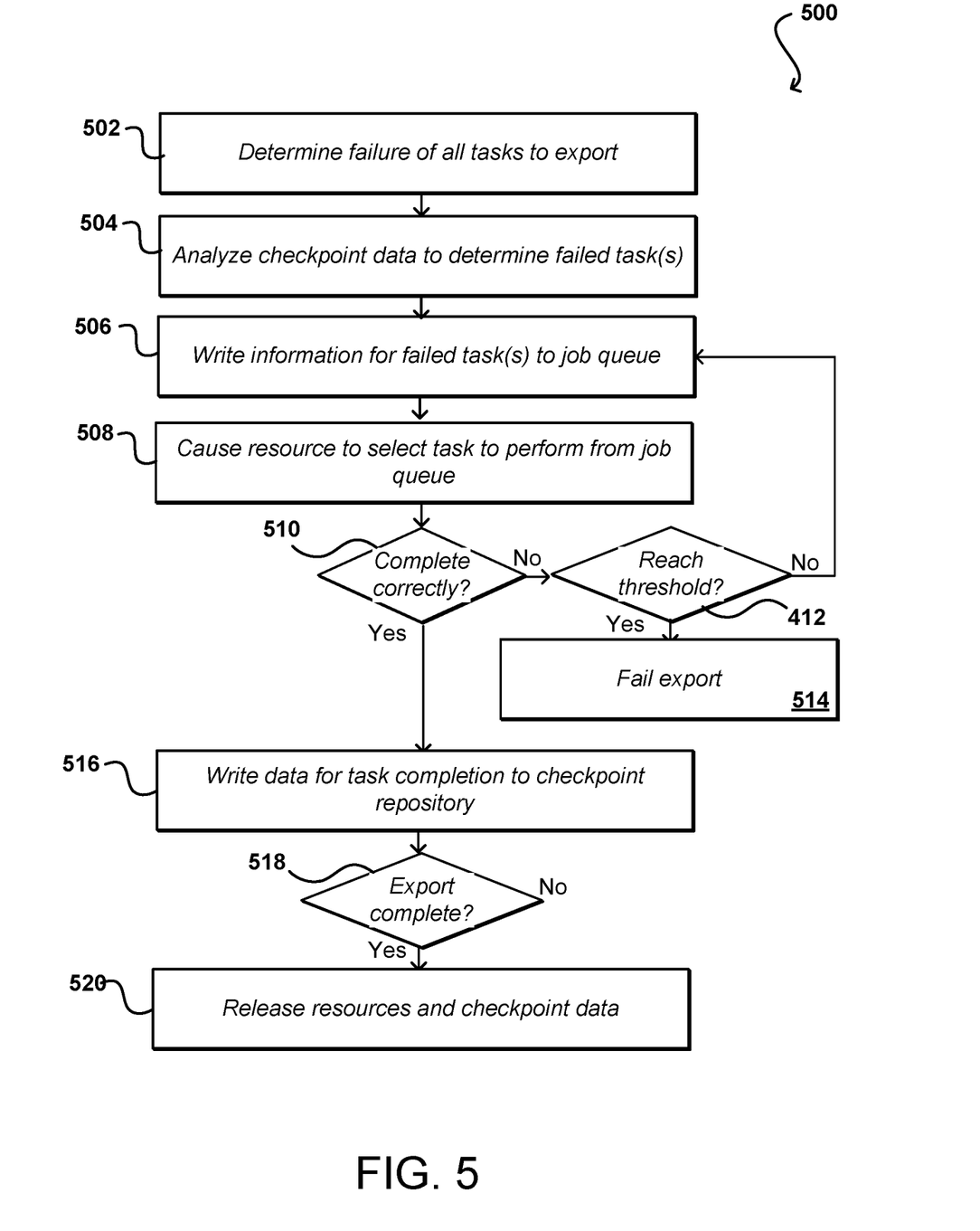
FIG. 5 illustrates an example process for managing the failure of one or more tasks for a data export that can be utilized in accordance with various embodiments.

As mentioned, however, in some situations not all of the tasks will be completed successfully. FIG. 5 illustrates an example process 500 for retrying portions of an export workflow in the event of a failure that can be utilized in accordance with various embodiments. In this example, a failure of all tasks to export can be determined 502. This can be in response to the detection of a failure of any individual task for the export or a determination at the end of an export attempt, among other such options. In response to the failure determination, a system or service such as a workflow manager or task manager can analyze 504 the checkpoint data, as well as the snapshot or other relevant data, for the export to determine which task(s) failed to complete successfully. As mentioned, these could be random tasks or tasks following from a failed task of a sequence, etc. Information for the failed task(s) can be written 506 to a job queue, adding to a task schedule, or otherwise provided for processing. One or more appropriate resources can then be caused 508 to select a respective task for processing from the job queue. For an individual task, a determination can be made 510 as to whether the task completed successfully. This can include receiving a task complete message, receiving a task failure message, or failing to receive a message within a determined period of time. In some embodiments a heartbeating procedure can be implemented whereby an allocated resource processing a task can send a periodic notification that it is processing a task. If a heartbeat is not received from a resource within a determined period of time, and no notification of task completion has been received, then it can be assumed in at least some embodiments that the task has failed to complete.

If a task did not complete successfully, another determination can be made 412 as to whether a threshold number of retries have been attempted, a threshold amount of time has passed, or other failure threshold or criterion has been reached or satisfied. If not, the process can continue with the task being retried. If the threshold or criterion has been reached or exceeded, then the export job as a whole can be failed 514. In some embodiments the partially exported data will be deleted, while in other embodiments the successfully exported data can be provided for access by the customer. Once a task has completed successfully, data for the task completion can be written 516 to a checkpoint repository in order to enable a workflow manager or other such system or service that the task was completed and does not need to be retried in the event of a failure. Other approaches can be used as well, such as to move a virtual cursor in an export snapshot or otherwise store information for the successfully completed task. The process can continue, and when it is determined 518 that the export has completed, the allocated resources and checkpoint data for the export that have not already been released can be released 520, deleted, or destroyed in order to free up system resources.

Certain types of failure may occur, however, that may not result in a retrying of any of the tasks. For example, if the designated customer bucket for receiving the export data no longer exists, or permission is no longer granted, then the entire export can be failed regardless of the number of successfully completed tasks. If a data source is experiencing problems such that a number of retries are unsuccessful then the export can be failed as a whole. Various other failure reasons can be designated as well within the scope of the various embodiments.

Figure 6:
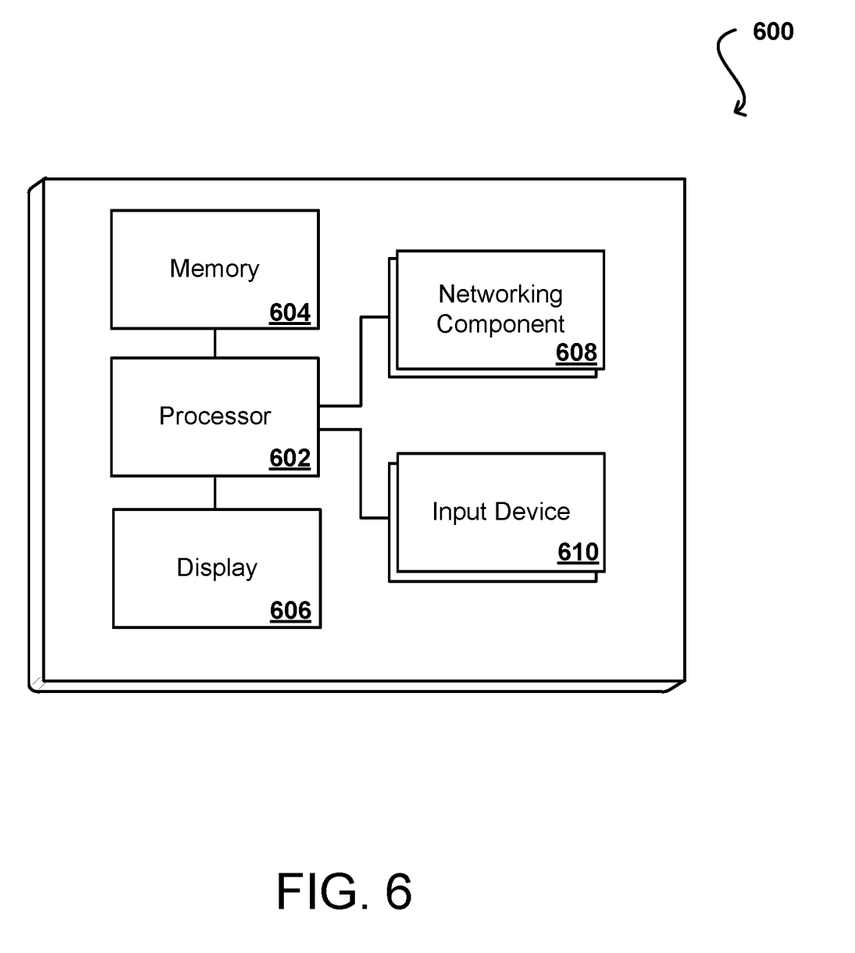
FIG. 6 illustrates example components of a computing device that can be used to implement aspects of the various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request to export customer log data generated over a specified period of time;
   determining the customer log data corresponding to the request, the customer log data being stored to a plurality of storage locations across a resource provider environment;
   generating a snapshot indicating a state of the customer log data at a time of the request, wherein the snapshot includes at least one status identifier to identify a partial completion of the request;
   assigning portions of the customer log data to a set of tasks, each task of the set of tasks responsible for writing a respective portion of the customer log data to a specified repository, wherein each respective portion is an independent and discrete portion of the customer log data;
   causing the tasks to be executed by one or more computing resources in the resource provider environment;
   updating the at least one status identifier with respect to the snapshot in response to one or more completed tasks, of the set of tasks, completing successfully in writing the respective portion of the customer log data to the specified repository;
   determining that at least one task, of the set of tasks, failed to complete successfully;
   determining, based at least in part upon the at least one status identifier and the snapshot, the at least one task that failed to complete successfully;
   causing the at least one task to be executed at least a second time by the one or more computing resources without re-executing the completed task of the set of tasks;
   causing the at least one task to be re-executed until the at least one task completes successfully or a maximum number of retries is reached for the request; and
   providing less than the requested log data if the at least one task fails to complete, wherein the provided log data includes log data retrieved by the one or more completed tasks.

2. The computer-implemented method of claim 1, further comprising:
   generating, for each successfully completed task of the set of tasks, a checkpoint entry in a checkpointing file for the request, wherein the at least one task that failed to complete successfully is determined based further in part upon the checkpoint entries in the checkpointing file.

3. The computer-implemented method of claim 1, further comprising:
   distributing the customer log data across the set of tasks based at least in part upon at least one of even object number distribution or even workload distribution.

4. The computer-implemented method of claim 1, further comprising:
   adding identifiers for the set of tasks to at least one of a task schedule or a job queue, wherein the set of tasks is able to be performed in sequence or concurrently.

5. A computer-implemented method, comprising:
   determining a set of data to be exported from at least one data repository;
   obtaining a snapshot indicating a state of the set of data to be exported, wherein the snapshot includes a status identifier to identify partial exportation of the set of data to be exported;
   assigning portions of the set of data to a set of tasks, each task causing a respective portion of the set of data to be exported, wherein each respective portion is an independent and discrete portion of the set of data;
   causing at least a subset of the set of tasks to be executed;
   updating the status identifier for the set of data in response to one or more completed tasks, of the set of tasks, completing successfully;
   determining that at least a failed task, of the set of tasks, failed to complete successfully;
   identifying, based at least in part upon the status identifier and the snapshot, the failed task and one or more successfully completed tasks;
   causing the failed task to be executed at least a second time without re-executing the one or more successfully completed tasks;
   causing the failed task to be executed until the failed task completes successfully or a maximum number of retries is reached for the failed task; and
   providing less than the requested log data if the at least one task fails to complete, wherein the provided log data includes log data retrieved by the one or more completed tasks.

6. The computer-implemented method of claim 5, wherein the status identifier tracks progress of the partial exportation of the set of data to be exported with respect to the snapshot.

7. The computer-implemented method of claim 5, further comprising:
   creating a checkpoint entry in a checkpointing file for the set of data, wherein the failed task and one or more successfully completed tasks are identified further based at least in part upon the checkpointing file.

8. The computer-implemented method of claim 5, further comprising:
   identifying a plurality of data objects corresponding to the set of data; and
   distributing the plurality of data objects across the set of tasks based at least in part upon relative numbers or relative sizes of the data objects assigned to each of the tasks.

9. The computer-implemented method of claim 5, further comprising:
   determining that the failed task failed to complete successfully in response to a failure message being received, a success message not being received within a first specified period of time, or a heartbeat notification not being received from a resource assigned to execute the failed task.

10. The computer-implemented method of claim 5, further comprising:
adding identifiers for the set of tasks to at least one of a task schedule or a job queue, wherein the set of tasks is able to be performed in sequence or concurrently.

11. The computer-implemented method of claim 5, wherein the set of data includes log data recorded for one or more log streams, associated with an owner of the data, over a specified period of time.

12. The computer-implemented method of claim 5, further comprising:
executing the set of tasks using a pool of computing resources of a resource provider environment.

13. A system, comprising:
at least one processor; and
memory including instructions that, when executed by the at least one processor, cause the system to:
determine a set of data to be exported from at least one data repository;
obtain a snapshot indicating a state of the set of data to be exported, wherein the snapshot includes a status identifier to identify partial exportation of the set of data to be exported;
assign portions of the set of data to a set of tasks, each task causing a respective portion of the set of data to be exported to a specified location, wherein each respective portion is an independent and discrete portion of the customer log data;
cause at least a subset of the set of tasks to be executed;
update the status identifier for the set of data in response to one or more completed tasks, of the set of tasks, completing successfully;
determine that at least a failed task, of the set of tasks, failed to complete successfully;
identify, based at least in part upon the status identifier and the shapshot, the failed task and one or more successfully completed tasks;
cause the failed task to be executed at least a second time without re-executing the one or more successfully completed tasks;
cause the failed task to be executed until the failed task completes successfully or a maximum number of retries is reached for the failed task; and
provide less than the requested log data if the at least one task fails to complete, wherein the provided log data includes log data retrieved by the one or more completed tasks.

14. The system of claim 13, wherein the status identifier tracks progress of the partial exportation of the set of data to be exported with respect to the snapshot.

15. The system of claim 14, wherein the instructions when executed further cause the system to:
create a checkpoint entry in a checkpointing file for the set of data, wherein the failed task and one or more successfully completed tasks are identified further based at least in part upon the checkpointing file.

16. The system of claim 14, wherein the instructions when executed further cause the system to:
determine that the failed task failed to complete successfully in response to a failure message being received, a success message not being received within a first specified period of time, or a heartbeat notification not being received from a resource assigned to execute the failed task.

17. The system of claim 14, wherein the instructions when executed further cause the system to:
cause identifiers for the set of tasks to be added to at least one of a task schedule or a job queue, wherein the set of tasks is able to be performed in sequence or concurrently.

* * * * *